J. F. WHISTLER.
ANTISKID DEVICE.
APPLICATION FILED JULY 11, 1916.
1,277,278.
Patented Aug. 27, 1918.
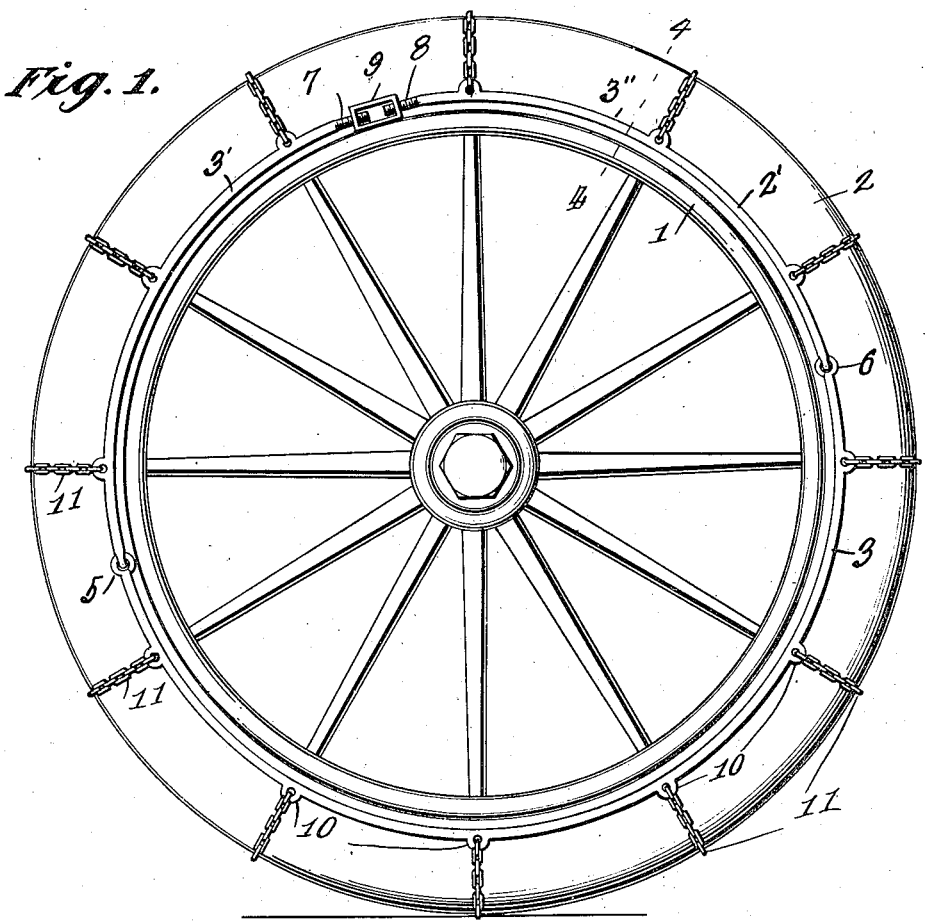
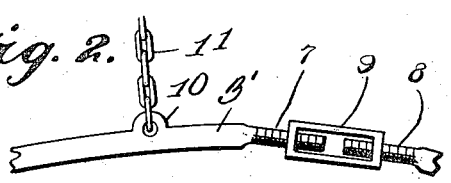
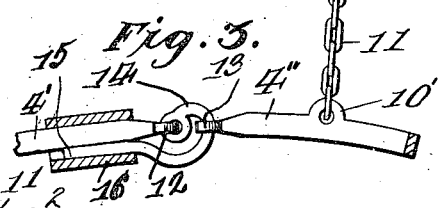
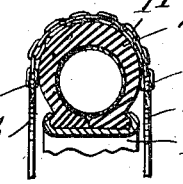
WITNESSES
W. C. Fielding
Guy M. Spring
INVENTOR
John F. Whistler
BY
Richard B. Owen
ATTORNEY

UNITED STATES PATENT OFFICE.

JOHN F. WHISTLER, OF HAVANA, KANSAS.

ANTISKID DEVICE.

1,277,278.

Specification of Letters Patent. Patented Aug. 27, 1918.

Application filed July 11, 1916. Serial No. 108,600.

*To all whom it may concern:*

Be it known that I, JOHN F. WHISTLER, a citizen of the United States, residing at Havana, in the county of Montgomery and State of Kansas, have invented certain new and useful Improvements in Antiskid Devices, of which the following is a specification.

This invention has reference to an antiskid device for automobile tires and has for its primary object the provision of a device of this class adapted to be attached to the tires in a manner to prevent the same from slipping or skidding when the automobile is operated in mud, snow, or upon wet and icy streets.

Another object of this invention is to provide a pair of circumferentially extending hoops adapted for opposite placement upon opposite sides of the tire and having a plurality of spaced apart eyes disposed around the peripheries thereof, the said eyes being oppositely disposed and connected by link chains passing transversely over the tire to prevent skidding of the same.

Another object is the provision of a pair of hoops, each of which comprises hingedly connected sections adapted to be folded one upon the other when the device is not in use and the whole device reduced in size so that it may be stored in a tool box.

A still further object is to provide in connection with the free ends of the hingedly connected sections means whereby the device may be adjusted to fit wheels of various sizes.

With these and other objects in view the invention consists in the construction and combination of the various parts as will be hereinafter described and pointed out in the appended claim.

In the drawings:—

Figure 1 is a side elevation of a wheel showing my anti-skid device applied to the tire thereof, Fig. 2 is a detail view illustrating a turn buckle used to connect the free ends of the outer hoop, Fig. 3 is a detail view illustrating the cam lever used to connect the free ends of the opposite hoop, and Fig. 4 is a section upon the line 4—4 of Fig. 1.

Referring specifically to the drawings by numerals, 1 indicates the rim of the wheel having the usual pneumatic tire 2 associated therewith. A hoop 2' extends circumferentially of the tire and consists of a semi-circular section 3, hingedly connected at 5 and 6 to a pair of sections 3' and 3", the free ends of which are reduced and threaded, as at 7 and 8 for the reception of a turn buckle 9. A hoop 4 is disposed upon the opposite side of said wheel and comprises a pair of semi-circular sections 4' and 4" hingedly connected at their meeting ends in the same manner and having their free ends provided with eyes 12 and 13 whereby the said free ends may be connected through the medium of a cam lever latch 14 adapted to draw the said free ends together in a manner clearly illustrated in Fig. 3 of the drawings. As is shown in Fig. 3, the cam lever 14 is provided with a handle 15 adapted to come against a part of the hoop and is secured in this position by a sliding sleeve 16.

Upon inspection of Fig. 1 it will be observed that the hoop 2' is provided with a plurality of spaced apart eyes 10 disposed upon the outer periphery thereof. The hoop 4 upon the opposite side of the wheel is also provided with a plurality of oppositely disposed eyes 10'; the said eyes 10 and 10' being connected by link chains 11 transversely overlying the tire tread and adapted to prevent the wheel from skidding.

While I do not wish to be strictly confined to the use of chains, I prefer them because they serve as an excellent anti-skid element and at the same time they permit one function which is peculiar to this invention, and which will now be described. Let us assume that the device is attached to a wheel on an automobile as in Fig. 1, with the hoop 2' on the outer side of the wheel and the hoop 4 next the body. When it is desired to remove the device, obviously the hoop 4 must be parted so that its ends can be moved across the axle. This is accomplished by sliding the sleeve 16 back on the section 4' until the handle 15 is free, and then swinging the handle and the cam lever around the eye 12 until they can be drawn out of the eye 13. The ends of the sections 4' and 4" are now free, and this hoop can be moved to pass its ends astride the axle and to take it from inside the wheel. Of course if the other hoop 2' had been inside the wheel it could be removed by running off the turn buckle 9 and passing the free ends astride the axle. In either case, however, having removed the hoop from the inside, the hoop on the outside is easily taken off because there is nothing in the way but the outside of the hub. The disconnected free ends of the hoop are now reattached to each other, and then both hoops can be folded to occupy one half their space. The hinge connections 5 and 6 of the hoop 2' are directly opposite the hinge connections and the connection of Fig. 3 of the hoop 4, and therefore when the hoop 2' is folded, the hoop 4 can be similarly folded, the chains 11 permitting. The entire structure is now reduced in size so that it can be packed away in a tool box or under a seat in small compass. When the next occasion arises where it is to be used, it is taken from its place and put back onto the wheel in the same manner.

What I claim is:—

In an anti-skid device for automobile wheels, the combination with a hoop adapted to lie against one side of the tire and made up of sections hingedly connected with each other at diametrically opposite points, one section being subdivided into smaller sections, and means for detachably and adjustably connecting the meeting ends of these smaller sections; of another hoop adapted to lie against the opposite side of the tire and made up of two semi-circular sections, means for hingedly connecting these sections at one end at a point opposite one of the hinge connections of the first-named hoop, means for hingedly and detachably connecting the same sections at their other ends at a point opposite the other hinge connection of the first-named hoop, and flexible elements connecting the hoops at points opposite each other and passing over the tire tread, as set forth.

In testimony whereof I affix my signature in presence of two witnesses.

JOHN F. WHISTLER.

Witnesses:
E. W. WORTHEN,
F. G. MOTT.